United States Patent Office 3,215,460
Patented Nov. 2, 1965

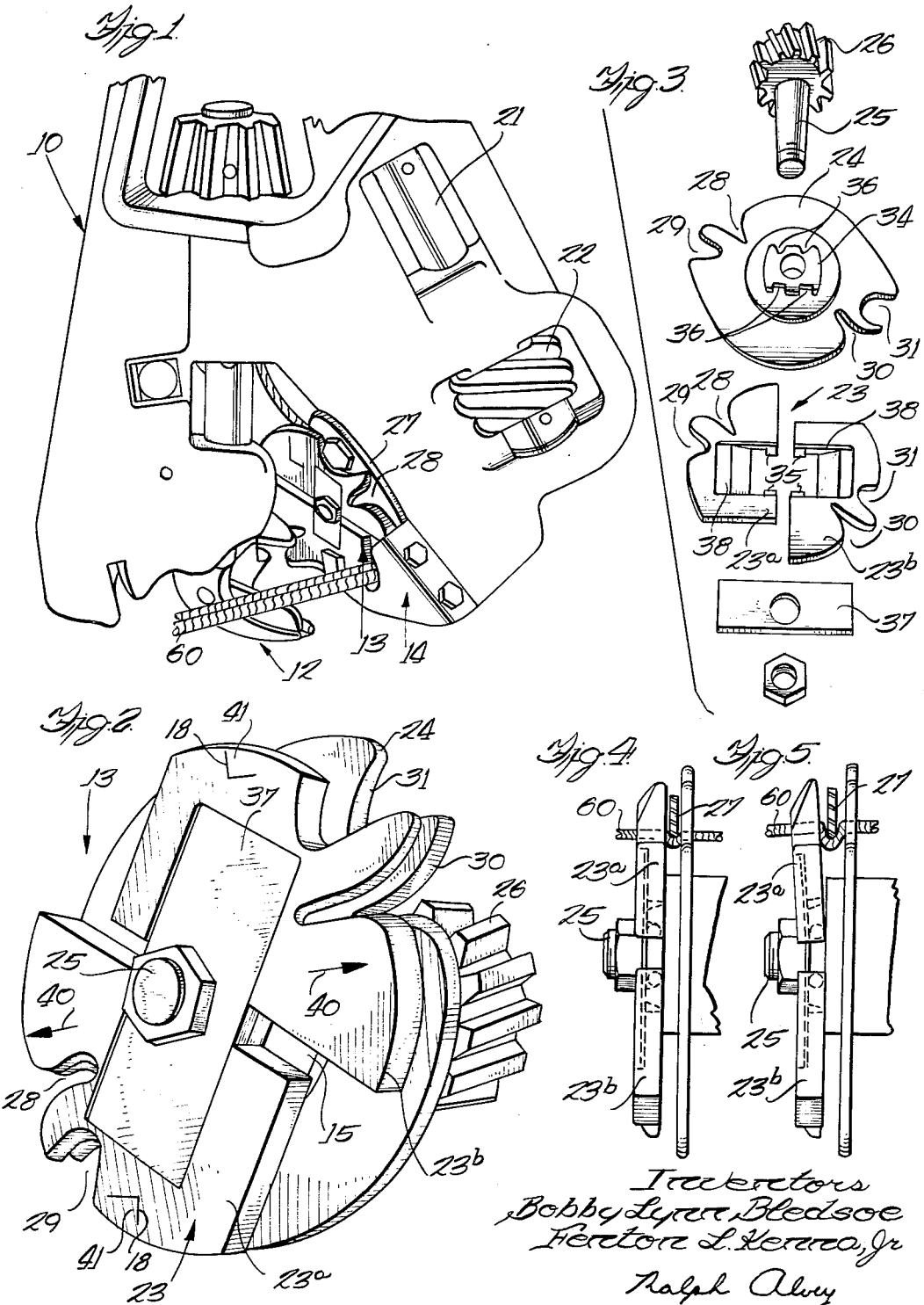

3,215,460
CORD HOLDER
Bobby Lynn Bledsoe and Fenton L. Kenna, Jr., Memphis, Tenn., assignors to International Harvester Company, Chicago, Ill., a corporation of New Jersey
Filed Dec. 6, 1963, Ser. No. 328,644
9 Claims. (Cl. 289—14)

This invention is a new and useful improvement in a cord holder for the twine tying mechanism of a hay baler. More particularly, the improvement comprises a twine disk cord holder having one disk made of spring-biased hinged parts that automatically compensate for variations in the size of the twine and for wear of the cord holder parts.

When a conventional cord holder becomes worn or is used with non-standard twine (e.g. defective twine of non-uniform diameter or synthetic twine of non-standard diameter), imperfect knots result. For example, if the cord holder parts are worn or the twine is undersize, the twine will pull loose from the conventional cord holder. Or, if the twine is oversize, it will jam in the conventional cord holder.

It is therefore the general object of this invention to provide an adjustable cord holder capable of coping with undersize and oversize twine and the effect of worn cord holder parts.

It is another object of this invention to provide a twin disk cord holder having one disk made of hinged parts that automatically compensate for variations in the size of the baling twine.

It is a further object of this invention to provide a twin disk cord holder wherein one disk comprises hinged parts that automatically compensate for the effects of wear of the cord holder parts.

The novel cord holder used to attain these objectives is shown in the drawings, where:

FIG. 1 shows a twine knotter assembly embodying the novel cord holder;

FIG. 2 is an enlarged view of the cord holder disk sub-assembly;

FIG. 3 is an exploded view of the cord holder disk sub-assembly;

FIG. 4 is a section through the sub-assembly of FIG. 2 showing an undersize strand of twine being gripped; and FIG. 5 is a section through the sub-assembly of FIG. 2 showing an oversize strand of twine being gripped.

The cord holder disk sub-assembly comprising the present invention can be used with the hay baler described in U.S. Patent No. 2,450,082 or with the knotter assembly described in U.S. Patent No. 3,101,963.

The knotter per se comprises (FIG. 1) a frame 10 having a hub (not shown) for mounting the knotter on a hay baler drive shaft. Frame 10 supports, in turn, a knotter bill hook assembly 12 for forming the knot, a cord holder assembly 13 for gripping the twine, and a knife 14 for cutting the twine to free the completed bale from the twine supply.

The cord holder assembly 13 (FIGS. 2–3) comprises a two-piece front disk 23 and a one-piece rear disk 24 mounted on one end of an arbor 25. Worm 26 on the other end of arbor 25 meshes with worm 22 on cord holder drive shaft 21. The end of shaft 21 carries a twine disk pinion (not shown), which receives power from a baler drive gear (not shown) to rotate the cord holder disks. Keeper blade 27 between disks 23 and 24 is pivotally mounted on frame 10.

Cord holder disks 23 and 24 resemble prior art disks in having sets of twine slots or cord holding stages located around their respective peripheries, each set of slots having a narrow slot 28 or 30 and a wide slot 29 or 31. Narrow slots 28 and 30 hold the free or bale end of the twine while a bale of hay is being packed and extend deeper into the disks than do the wide slots. This extra depth enables the free end of the twine to move past twine knife 14 without being cut, thereby, leaving the free end of the twine intact for use in forming the knot. Wide slots 29 and 31 receive the needle or spool end of the twine when the loop around the bale is completed. Timing marks 40 and 41 on the surface of front disk 23 are used with the zero graduation 18 on keeper blade 27 to synchronize the disk rotation with the movement of the baler needle and other twine tying components.

Front disk 23 (FIG. 3) comprises two identical segments 23A and 23B pivotally mounted on the hub 34 of rear disk 24. Pins 35 projecting from each disk section 23A and 23B fit into recesses 36 cut into hub 34. Disk sections 23A and 23B pivot about pins 35 and are biased toward rear disk 24 by a leaf spring 37. Spring 37 is held in recess 38 in the surface of each front disk section by a nut on arbor 25. A space 15 separates the two disk sections 23A and 23B so that trash will not accumulate between the disks.

The operation of the novel cord holder is shown in FIG. 4 and FIG. 5. The formation of a loop of twine around a bale of hay starts with the return stroke of the baler needle arm (not shown), when twine 60 is fed from the needle arm into a narrow slot 28 or 30 on both the front and rear disks. Thereafter, the disks rotate clockwise (relative to the drawings), moving the twine in the narrow slots 28 or 30 under keeper blade 27 and forming a U-shaped kink in the twine. That is, the twine passes through the narrow slot 28 or 30 in the front disk 23, down through the space between the front disk 23 and the keeper blade 27, under the keeper blade 27, up through the space between the keeper blade 27 and the rear disk 24, and out through the narrow slot 28 or 30 in the rear disk.

The ability of the cord holder to grip the twine ordinarily depends on various factors, such as, the width of the restricted space between the disks 23 and 24 and the keeper blade 27, the diameter of the twine, and the like. With the adjustable front disk of the present invention, however, the negative effect of these factors is substantially reduced or completely eliminated. If the twine 60 is undersize (FIG. 4), spring 37 forces the front disk segment towards the keeper blade 27 to exert a firm grip on the twine located between the front disk 23 and the keeper blade 27. Likewise, if the twine 60 is oversize (FIG. 5), spring 37 allows the front disk segment 23A or 23B to move away from the keeper blade 27 to provide proper space for the twine so that it will not jam in the cord holder at the end of the cycle.

According to the foregoing description, a new and improved cord holder for the twine tying mechanism of a hay baler has been disclosed. Since various modifications in the details of construction will be obvious to persons skilled in the art (e.g. the use of other forms of springs or pivots, adapting the novel concept to other forms of cord holders, relocating the adjustable member, etc.), it is not intended to limit the present invention to the exact form shown but to embrace, also, those obvious variations that fall within the spirit and scope of the attached claims.

The invention claimed is:

1. A cord holder for a knotter mechanism, comprising: a knotter frame, a hub rotatably mounted on said frame, a pair of cord holder disks on said hub, one of said disks including a segment pivotally mounted on said hub, a keeper blade pivotally mounted on said knotter frame and extending between said disks, and resilient means on said knotter frame biasing said segment toward said keeper blade.

2. A cord holder for a knotter mechanism, comprising: a knotter frame, a first rotary cord holder disk rotatably mounted on said frame, a second cord holder disk, including a segment, said segment being pivotally mounted on said first disk, and resilient means on said knotter frame biasing said segment toward said first disk.

3. A cord holder for a knotter mechanism, comprising: a knotter frame, a first cord holder disk including a hub, rotatably mounted on said frame, a second cord holder disk including a segment pivotally mounted on said hub, a keeper blade pivotally mounted on said knotter frame and extending between said disks, and resilient means on said knotter frame biasing said segment toward said keeper blade.

4. A cord holder for a knotter mechanism, comprising: a knotter frame, a first cord holder disk including a hub rotatably mounted on said frame, a second cord holder disk comprising a plurality of segments, said segments being pivotally mounted on said hub, a keeper blade pivotally mounted on said knotter frame between said disks, and resilient means on said knotter frame and common to each of said segments biasing said segments towards said keeper blade.

5. A cord holder for a knotter mechanism, comprising: a knotter frame, a first cord holder disk having twine slots in the periphery thereof and a hub projecting from one side thereof rotatably mounted on said frame, a second cord holder disk comprising a plurality of segments, said segments being pivotally mounted on said hub, each said segment having twine slots in the periphery thereof, a keeper blade pivotally mounted on said knotter frame and extending between said disks, and spring means on said knotter frame common to each of said segments biasing said segments towards said keeper blade.

6. A cord holder for a knotter mechanism, comprising: a support, a passage through said support for mounting said support on a shaft, a pair of cord holder disks, slot means in said disks for receiving binding material, at least one of said disks being formed of a plurality of segments pivotally mounted on said support, spring means biasing said segments towards the other of said disks.

7. A cord holder as recited in claim 6 wherein said support comprises a hub on said other disk, and said pivotal mounting means comprises a pair of recesses formed in said hub for each said segment, a pair of pins on each said segment, each said pair of pins fitting into a respective one of said pairs of recesses.

8. A cord holder disk, comprising: a support, a passage through said support for mounting said support on a shaft, a plurality of disk segments, each said disk segment including slot means for receiving binding material, means pivotally mounting each said segment on said support, spring means biasing each said segment to effect a gripping action by each said segment on binding material.

9. A cord holder disk as recited in claim 8, wherein said means mounting said segments on said support comprises: a pair of recesses formed in said support for each said segment, a pair of pins on each said segment, each said pair of pins fitting into a respective one of said pairs of recesses.

References Cited by the Examiner
UNITED STATES PATENTS

| 515,113 | 2/94 | Coppage | 289—14 |
| 744,153 | 11/03 | Appleby | 289—14 |
| 2,703,246 | 3/55 | Bornzin | 289—15 |

DONALD W. PARKER, *Primary Examiner.*